United States Patent
Mueller et al.

(10) Patent No.: US 7,791,297 B2
(45) Date of Patent: Sep. 7, 2010

(54) METHOD OF CONTROLLING A MOTOR

(75) Inventors: Thomas Mueller, Klostedeclfeld (DE); Johannes Stempfhuber, Landsberg (DE); Germar Meiendres, Landsberg (DE); Konstantin Baxivanelis, Kaufering (DE); Markus Looser, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 233 days.

(21) Appl. No.: 11/897,387

(22) Filed: Aug. 30, 2007

(65) Prior Publication Data

US 2008/0054832 A1 Mar. 6, 2008

(30) Foreign Application Priority Data

Sep. 4, 2006 (DE) .................. 10 2006 000 443

(51) Int. Cl.
*H02K 17/32* (2006.01)
(52) U.S. Cl. .................. 318/434; 361/23; 361/31; 361/33
(58) Field of Classification Search .......... 318/434; 361/23, 31, 33
See application file for complete search history.

(56) References Cited

U.S. PATENT DOCUMENTS

| | | | | |
|---|---|---|---|---|
| 5,468,176 A | * | 11/1995 | Udert et al. ............. | 451/359 |
| 5,719,732 A | * | 2/1998 | Nagahama et al. ........ | 361/29 |
| 6,026,926 A | * | 2/2000 | Noro et al. .............. | 180/446 |
| 6,225,769 B1 | * | 5/2001 | Brenner et al. ........... | 318/434 |
| 7,208,909 B2 | * | 4/2007 | Simon .................... | 318/778 |

* cited by examiner

*Primary Examiner*—Bentsu Ro
*Assistant Examiner*—David S Luo
(74) *Attorney, Agent, or Firm*—Abelman, Frayne & Schwab

(57) ABSTRACT

A method for controlling a motor (2) which drives a disk-shaped tool (4) of a power tool (1) and to which a motor voltage in the amount of a nominal value is applied in an "on" position of a motor switch (6), includes determination of an actual motor current (IM) applied to the motor (2) and comparing it to a first predetermined threshold (GW1), and automatically triggering of a control process for protecting the motor (2) when an overload condition which is defined in that the first predetermined threshold (GW1) is exceeded beyond a first predetermined limiting time period (grDt1), is met, the control process including reduction of the motor voltage applied to the motor (2) by a magnitude that can be perceived by the user as a choke value.

7 Claims, 2 Drawing Sheets

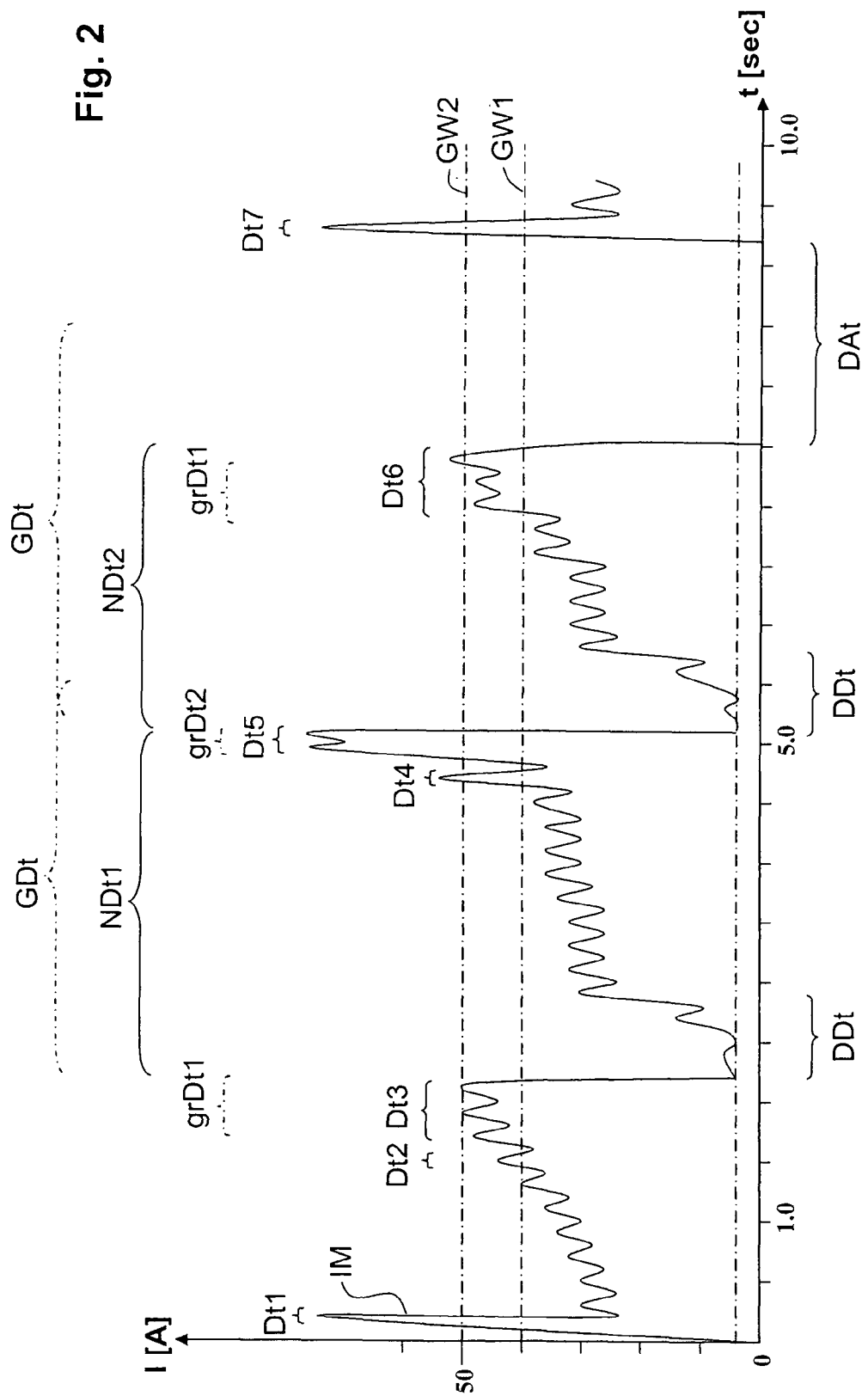

METHOD OF CONTROLLING A MOTOR

BACKGROUND OF THE INVENTION

1. Field of the Invention

The invention is directed to a method of controlling a motor of a power tool such as, in particular, a hand-held circular saw, and a control device for carrying out the method. The motor drives a disk-shaped tool of the power tool in an "on" position of a motor switch. For this purpose, a motor voltage in the amount of a nominal value is applied to the motor. The nominal value can be substantially fixed or can depend on a battery voltage or line voltage supplying the power tool. In each instance, an actual motor current applied to the motor is determined and compared to a first predetermined threshold in a first step. When it has been detected that an overload condition is met, a control process for protecting the motor from overloading is triggered automatically in a second step.

2. Description of the Prior Art

Control methods of the type mentioned above serve to protect the power tools in question against overloading of the motor. This overloading occurs, for example, when the disk-shaped tool is moved too quickly or with excessive pressing force relative to the material to be machined. Because of the increased resistance torque, this causes the motor to heat up which can lead to the destruction of the motor after a certain period of time.

Japanese Publication JP 4348809 discloses a stationary machine saw with a disk-shaped tool for cutting coilable material which automatically generates a movement of the tool relative to the coilable material during operation. A motor for driving the tool is protected against overloading by monitoring a motor current applied to the motor. As soon as this motor current exceeds a predetermined threshold, the forward feed movement of the tool relative to the material is reduced. Destructive heating of the motor can be prevented by means of this known control method.

However, this known procedure is based on a controlled movement of the tool relative to the material to be machined and is therefore not suited to hand-held power tools such as circular saws.

SUMMARY OF THE INVENTION

It is the object of the present invention to provide a control method which is also suitable for hand-held power tools.

This object is met, according to the invention, in that the overload condition is defined when the first predetermined threshold is exceeded beyond a first predetermined limiting time period. When this overload condition is met, the control process for protecting the motor is carried out in the second step, wherein the motor voltage applied to the motor and accordingly the motor output is reduced by a magnitude that can be perceived by the user to a choke value. In response to this noticeable reduction in motor voltage and motor output, the user reflexively pulls back on the power tool so that the tool is again substantially free and can also start again with a reduced motor current.

The choke value is advantageously at most 75%, particularly 40% to 60%, of the nominal value. In this way, the motor output of the motor is reduced to an extent that is readily perceived by the user, particularly because the tool usually comes to a stop as a result of the reduced output. In addition, further heating of the motor can be ruled out at this value.

In a particularly preferred procedure, the motor voltage is increased again relative to the choke value in a third step so that the motor voltage and therefore also the output of the motor reaches the nominal value again, at the earliest, after the expiration of a predetermined choking period. Accordingly, in case of overloading of the motor, the output can be automatically reduced and also increased again by the hand-held power tool without having to move the motor switch from the "on" position into an "off" position and then back again. In this way, the loss in work time brought about by the simulated blocking can be minimized.

The choking period is advantageously at most 1 second, particularly 0.2 to 0.7 seconds, so that, on the one hand, there remains sufficient time for the reflexive pulling back on the power tool but, on the other hand, the motor voltage or output of the motor is again at least approximately at the level of the nominal value before the user deliberately moves the motor switch out of the "on" position. In this way, the delay in operating time caused by the simulated blocking approaches zero.

The first limiting time period is preferably at most 1 second, in particular 0.2 to 0.7 seconds, so that an unwanted blocking due to temporary peaks in the motor output, e.g., when starting the motor, are prevented simultaneously, but the duration of overloads is limited in such a way that the motor is protected against damage resulting therefrom.

In an advantageous manner, the actual motor current is additionally compared in the first step to a second threshold that is higher than the first threshold. When it is detected that the second threshold is exceeded beyond a second predetermined limiting time period which is less than the first predetermined limiting time period, the motor voltage is reduced to the choke value in the second step. In this way, two different overload conditions can be defined, one overload condition being defined by the greater overload and the other by the longer limiting time period. Accordingly, the control can be adapted particularly well to different operating conditions of the power tool.

In an advantageous embodiment form, the output of the motor is reduced by pulse width modulation so that the output of the motor is reduced reliably and exactly in case of overload.

Further, it is particularly advantageous when overload events that follow the respective preceding overload event within a predetermined limiting time period are counted in a fourth step. The overload events always take place when the overload condition is met and the second step is accordingly carried out. In addition, in a fifth step, the motor is turned off at a predetermined value of the counted overload events. In this way, the motor can be protected effectively against damage due to recurring overloading which, for example, can occur when the user applies excessive pressure on the saw blade for extended periods.

Further, the above-stated object is met by a power tool with a control device for implementing the method in one of the embodiments mentioned above.

It is advantageous when at least the first and the second steps, but preferably all five steps, are carried out by means of an electronic device so that the control process can proceed in an exact manner.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS:

The drawings show:

FIG. 2 an example of a waveform of a motor current of the motor when using the control method according to the invention.

DETAILED DESCRIPTION OF THE PREFERRED EMBODIMENT

Figure 1:
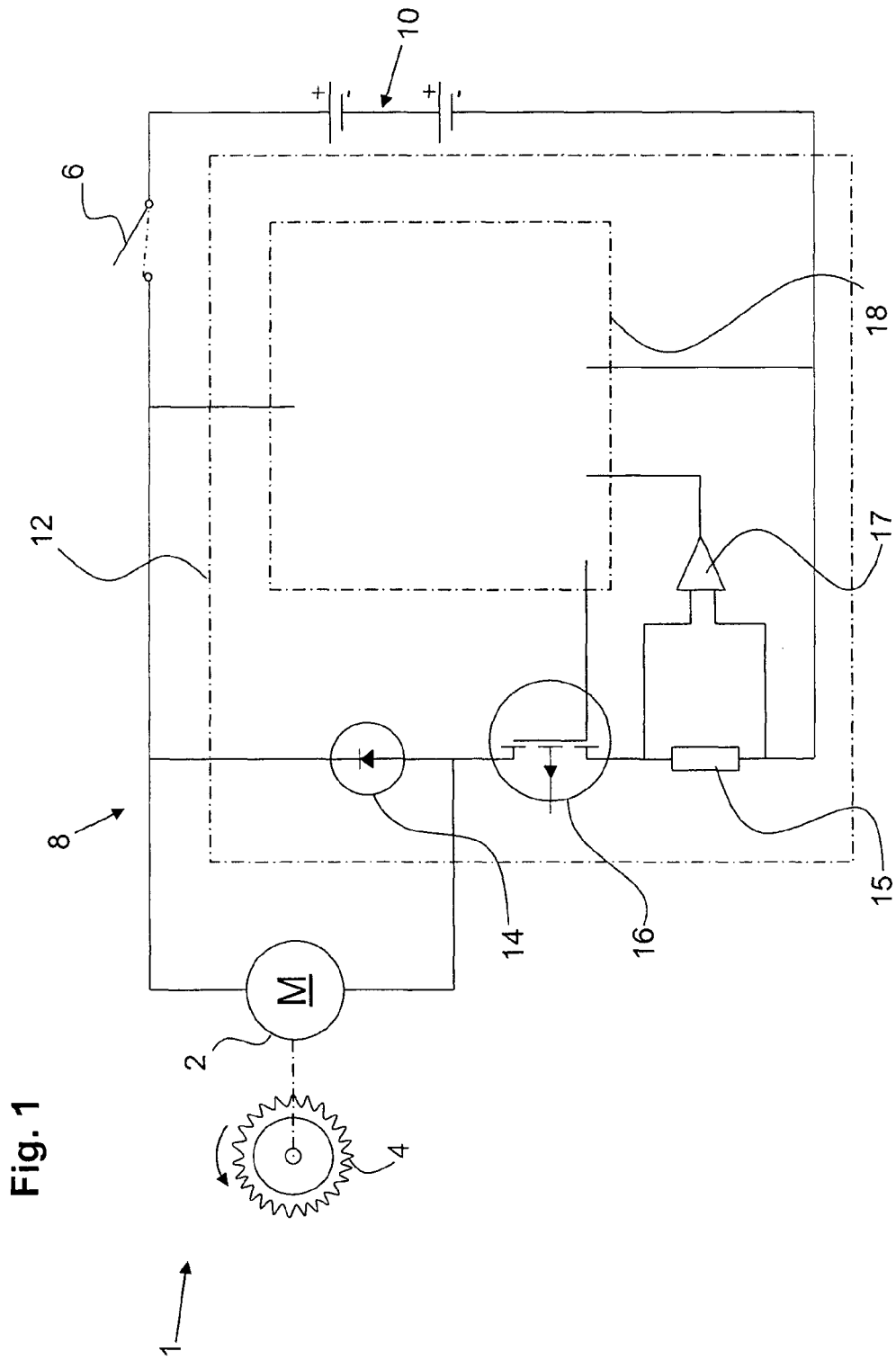
FIG. 1 a schematic view of a control device of a power tool for carrying out a control method according to the invention for a motor which is provided for driving the power tool.

FIG. 1 shows a power tool 1 in the form of a hand-held circular saw with a motor 2 by which a disk-shaped tool 4 in the form of a saw blade can be driven at a nominal power. For this purpose, a motor voltage in the amount of a nominal value is applied to the motor 2. The motor 2 can be turned on and off by means of a switch 6 of a control device which is designated in its entirety by a reference numeral 8. For this purpose, the switch 6 is displaceable between an "off" position shown in the drawing and an "on" position shown in dash-dot lines. In the "on" position, a battery voltage generated by a battery 10 is applied to the motor 2.

The control device 8 has an electronic device 12 which includes a protection diode 14, a shunt in the form of a low-ohms resistor 15, an electronic power switch 16, an operation amplifier 17, and a control unit 18. A motor current IM, which is applied when the motor 2 is operated, is permanently determined by the resistor 15 and the operation amplifier 17 of the electronic device 12. Depending on the determined motor current IM, the motor voltage and, therefore, the output of the motor 2 can be reduced by pulse width modulation by means of the control device 8 and the electronic power switch 16 in order to reduce the motor current IM and to protect the motor 2 against overloading.

A waveform of the motor current IM during the use of the control method according to the invention is shown by way of example in FIG. 2. As can be seen, a first threshold GW1 of 40 A and a second threshold GW2 of 50 A are determined for the motor current IM by the electronic device 12.

In a first step of the control method, the electronic device 12 detects time periods Dt during which the motor current IM lies above the predetermined thresholds GW1 and GW2. Referring to the first threshold GW1, the determined time periods Dt are compared to a first limiting time period grDt1 of at most 1 second, preferably 0.2 to 0.7 seconds, and, referring to the second threshold GW2, are compared to a second limiting time period grDt2 of 0.01 to 0.2 seconds, particularly 0.015 to 0.025 seconds, which together with the two thresholds GW1 and GW2 define an overload condition. For reasons of clarity, the second limiting time period grDt2 of 0.2 seconds is selected for the example according to FIG. 2.

When the determined motor current IM exceeds the first threshold GW1 for a time period longer than the predetermined first limiting time period grDt1 as in the example during time periods Dt3 and Dt6, or exceeds the second threshold GW2 for longer than the predetermined second limiting time period grDt2 as in the example during time period Dt5, one of the overload conditions predetermined by the electronic device 12 is met. As a result, the output of the motor 2 is reduced by pulse width modulation to 40% to 60% of the nominal power in a second step of the control process by means of the electronic device 12.

In a third step, the motor voltage and accordingly the output of the motor 2 is then automatically increased again from the choke value before the user deliberately moves the switch 6 into the "off" position or before the user can release the switch 6 so that the switch 6 is moved automatically into the "off" position, for example, by means of spring action. In so doing, the motor voltage is gradually increased again from the choke value to the nominal value only during a choking period DDt of at most 1 second, preferably 0.2 to 0.7 seconds. In this way, it is ensured that the output of the motor 2 is automatically reduced after an overload condition is met in order to protect it from temperature-related damage and is subsequently also increased again approximately to the fill nominal power before the user can deliberately actuate the switch 6. In this way, the working process remains extensively unperturbed so that there is no substantial loss of operating time.

When the motor 2 is started by actuating the switch 6 or when restarting according to the third step, the monitoring of the two thresholds GW1, GW2 is deactivated over a certain starting time period in order to prevent the overload conditions from being met by a mere start-up peak.

Also provided in the control method is a fourth step in which a succeeding time period NDt is detected which follows a respective overload event in which the overload condition was met and which lasts at most until the respective following overload event. When a succeeding time period NDt of this kind is shorter than a predetermined limiting time period GDt, an actual value of a logical counter is increased by one. When the value of this logical counter, which therefore corresponds to a determined quantity of directly successive overload events, reaches a predetermined threshold, e.g., three, corresponding to the example shown herein, the motor (2) is completely turned off in a fifth step.

On the other hand, when a succeeding time period NDt of the kind mentioned above exceeds the limiting time period GDt, the actual value of the logical counter is decreased.

In the waveform shown by way of example in FIG. 2, the overload event after time period Dt3 is followed by the succeeding time period NDt1 which lasts until the overload event after time period Dt5. Since the determined succeeding time period NDt1 is shorter than the predetermined limiting time period GDt, the value of the logical counter, after having been increased from zero to one by the first overload event after time period Dt3, is increased again by one to two by the following overload event after time period Dt5.

The succeeding time period NDt2 which lasts until the overload event after time period Dt6 is also shorter than the limiting time period GDt. Therefore, the value of the logical counter is increased once more by one to three. Since the predetermined threshold of three is accordingly reached, the electronic device 12 turns off the motor 2 completely in order to protect the motor 2 from continuously recurring overloads.

The user must now initially move the switch 6 to the "off" position, or allow it to return to the "off" position, and then move it back into the "on" position in order to set the motor 2 in operation again. This provides for a turn-off period DAt during which the motor 2 can cool off.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A method for controlling a motor (2) for driving a disk-shaped tool (4) of a power tool (1) and to which a motor voltage in the amount of a nominal value is applied in an "on" position of a motor switch (6), comprising the first step of determining an actual motor current (IM) applied to the motor (2) and comparing it to a first predetermined threshold (GW1); and a second step of automatically triggering a control process for protecting the motor (2) from overloading when an overload condition, which is defined in that the first predetermined threshold (GW1) is exceeded beyond a first predetermined limiting time period (grDt1), is met, the control process including reducing the motor voltage applied to the motor (2) by a magnitude that can be perceived by a user as a choke value; and further steps of counting overload events during which the overload conditions are met when they follow one another within a predetermined limiting time period, and turning the motor (2) off after a predetermined quantity of counted overload events.

2. A method according to claim 1, wherein the choke value is at most 75% of the nominal value.

3. A method according to claim 1, comprising the step of increasing the motor voltage relative to the choke value, with the motor voltage reaching the nominal value again, at the earliest, after expiration of a predetermined choking period (DDt).

4. A method according to claim 3, wherein the predetermined choking period (DDt) is at most 1 second.

5. . A method according to claim 1, wherein the first limiting time period (grDt1) is at most 1 second.

6. A method according to claim 1, wherein the actual motor current determining step includes comparing the actual motor current (IM) to a second threshold (GW2) that is higher than the first threshold (GW1), and wherein with the second threshold (GW2) being exceeded beyond a second predetermined limiting time period (grDt2) which is less than the first predetermined limiting time period (grDt1), the motor voltage is reduced to the choke value in the second step.

7. A method according to claim 1, wherein output of the motor (2) is reduced by pulse width modulation.

\* \* \* \* \*